No. 629,059.
F. W. ARVINE.
METHOD OF SEPARATING EMULSIONS.
(Application filed Feb. 7, 1898.)
Patented July 18, 1899.
(No Model.)
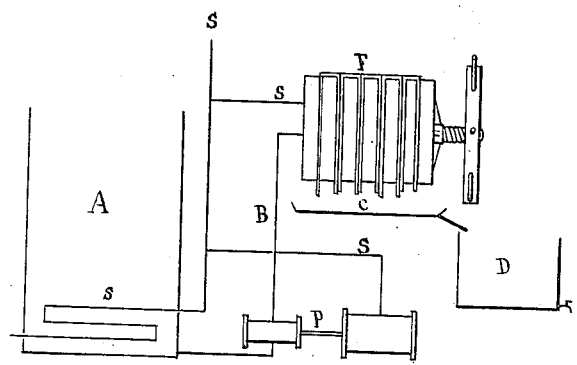
WITNESS
J. Brooks.
P. Smith.
INVENTOR
Freeling W. Arvine.
BY
E. W. Bond
ATTORNEY

UNITED STATES PATENT OFFICE.

FREELING W. ARVINE, OF NEW YORK, N. Y.

METHOD OF SEPARATING EMULSIONS.

SPECIFICATION forming part of Letters Patent No. 629,059, dated July 18, 1899.

Application filed February 7, 1898. Serial No. 669,392. (No specimens.)

*To all whom it may concern:*

Be it known that I, FREELING W. ARVINE, a citizen of the United States, residing at New York, county of New York, and State of New York, have invented a new and useful Improvement in Methods of Separating Emulsions and Mixtures of Water, Oil, and Sedimentary or Floating Matters, which improvement is fully set forth in the following specification.

This invention relates to a method for the treatment of water-gas tar. The oil or tar obtained in the manufacture of water-gas is often largely composed of an emulsion which often has the appearance of a thick mixture of water, oil, and lampblack, with more or less free oil floating upon it, and sometimes a little water slowly collecting at the bottom. The mixture already mentioned seems never to separate by subsidence under any circumstances. Many expensive and unsuccessful attempts have been made to remove the oil in a practical manner. I have discovered that in the case of water-gas tar the solid portion of this mixture or emulsion, which looks like lampblack, is really fusible pitch in a state of very fine comminution; also, that if this pitch-dust be separated then the other portions—the oil and water—soon separate on standing. In like manner other persistent emulsions of petroleum residues and coal-tar oils containing solid matters all separate from the water with which they are associated upon the removal of the solid element, which seems necessary to the emulsion. Sometimes this emulsion is like liver in appearance and consistency and contains but a very small portion of solid matter. Such mixtures as these are generally thrown away from gas-works and oil-works in the easiest manner possible. The term "water-gas" is intended to distinguish this "tar," which is a by-product in the manufacture of water-gas, from the tar obtained ordinarily in the manufacture of coal-gas and called "coal-tar." The water-gas tar is not a combination of materials or substances in layers, but part of it is a mixture in persistent and practically permanent emulsion. This emulsion is heavier than the clear fluid tar, which floats upon and above the emulsion, which it is the object of my invention to economize by separating the "mud," which I can melt into pitch, and the oil portion, which, being freed from water and sediment, (finely comminuted pitch,) is useful for fuel and other purposes.

In carrying out my method I proceed in the following manner: After drawing off such oil from the top and water from the bottom as may be separated by warmth and standing a short time, the mixture is forced through felt, canvas, or any suitable filtering medium by means of a filter-press or centrifugal machine or like device of any usual construction. In this operation the solid matter is collected in a cake on the filters and the oil and water are run into receptacles, where the water soon settles, and being drawn off leaves clean oil. When, however, the oil is as heavy as the water or when the emulsion is very thick or "livery," this plan alone is not sufficient. In such case I add some soluble substance capable of increasing the gravity of the water and having such affinity for water as to destroy the emulsion before attempting to filter out the solid matter. Sodium sulfate, residue from acid-works, is desirable when the emulsion is alkaline; but the same compound in a neutral state is generally desirable. It is added to increase the weight of the water and destroy its affinity for the other constituents of the emulsion. Almost any cheap and available acid and alkali compound soluble in water may answer well and only needs to be stirred up with the mixture, preferably with heating, until the water begins to separate, which can be seen in a test-glass. When the mixture has a "curdled" or "flocky" appearance, it may be filtered in any convenient manner. The ordinary filter-press is useful for this purpose, and is so arranged as to finish the pressing and wash the cake by introducing steam, hot water, and petroleum naphtha or any desired solvent or solvents to remove the last traces of oils and chemicals from the "press-cake," which is simply melted to form pitch. Whenever the pitch is too fusible, water may be preferable to steam to clear the cake of the greater portion of oil. I use petroleum naphtha or other petroleum products finally to clean and sweeten the cake from water-gas tar, which is generally scarcely soluble in most petroleum products.

The drawing accompanying this application, with the parts shown in diagram, will further explain my process, the relative sizes and arrangement of parts of the apparatus being for purposes of illustration only.

In the said drawings, A is a tank of any desired capacity. S is a coil of steam-pipe for the purpose of warming the material in the said tank.

F is a filter-press. C is a pan beneath the same.

D is a tank arranged to receive the discharge from the pan.

P is a force-pump.

The operation is as follows: The refuse material is received into the tank A, where it is warmed by means of the coil of steam-pipe S, and the salts are stirred in. When heated and mixed sufficiently, the mass is forced by the pump P into the filter-press F through a suitable pipe B, and upon the cloths of the press the solid matter deposits and forms a hard cake. The oil and water drain into the pan C and flow into the tank D, where they separate rapidly and may be drawn off in turn by faucets conveniently placed.

Many other forms of forcing devices and filtering apparatus may answer well to carry out my process. The filter-press outlined in the drawing is a kind common in trade and with an ordinary steam force-pump is found to be a convenient form. The filter-cloths are folded over distance-plates and a screw with a hand-wheel closes them securely.

The solid matter or "cake" collected between the filter-cloths may be cleared of oil and saline matters by steam applied by the pipe S and removed by loosening the screw.

The proportions of emulsion and salt may be varied, and, in fact, must necessarily vary; but I have found it preferable to employ to every one hundred and fifty barrels of emulsion about three hundred pounds, more or less, of dry salt.

No claim is made herein to the apparatus herein shown and described, as the same may form the subject-matter of a separate application.

What I claim as new is—

1. The herein-described method of treating water-gas tar, which consists in adding a coagulent, filtering under pressure, and then heating, substantially as described.

2. The herein-described method of treating water-gas tar, which consists in adding a soluble substance to increase the gravity of the water, then filtering under pressure and then washing, substantially as specified.

3. The herein-described method of treating water-gas tar, which consists in salting and heating the same, filtering, then pressing, washing and fusing the residue or "cake," substantially as described.

FREELING W. ARVINE.

Witnesses:
CHAS. WAHLERS,
CHARLES G. COE.